United States Patent

Mitchell

[15] 3,690,763

[45] Sept. 12, 1972

[54] APPARATUS FOR COMPUTING COLOR BALANCE CHARACTERISTICS AND PREPARING IMPROVED COLOR PRINTS

[72] Inventor: Robert W. Mitchell, 707 Myrtle Ave., Saint Joseph, Mich. 49085

[22] Filed: Feb. 27, 1967

[21] Appl. No.: 618,799

Related U.S. Application Data

[63] Continuation-in-part of Ser. No. 478,665, Aug. 10, 1965, Pat. No. 3,443,868.

[52] U.S. Cl. ........................................355/88, 355/35
[51] Int. Cl. ............................................G03b 27/24
[58] Field of Search.............................355/35, 71, 88

[56] References Cited

UNITED STATES PATENTS 2,186,619 1/1940 Sauer...........................355/71
2,388,842 11/1945 Hanson........................355/35

*Primary Examiner*—John M. Horan
*Attorney*—Pendleton, Neuman, Williams & Anderson

[57] ABSTRACT

A colorimeter which is adapted for accurately comparing an unknown light with a light of standard color to enable the adjustment or compensation of the unknown color to produce a desired effect in photography or the like. One colorimeter is on a universal mounting and has a filter support spaced from a comparing surface to direct the unknown light with filter compensation along an axis unto a small central mirror mounted at an angle to the light axis on the comparing surface. A source of known light of controlled and constant color and intensity is within the colorimeter and illuminates the comparing surface around the small mirror. The disclosure includes alternate embodiments and unique methods of utilizing the colorimeter.

7 Claims, 5 Drawing Figures

Patented Sept. 12, 1972

3,690,763

2 Sheets-Sheet 1

INVENTOR.

ROBERT W. MITCHELL

BY PENDLETON, NEUMAN
SEIBOLD & WILLIAMS

ATTORNEYS

Patented Sept. 12, 1972 3,690,763

2 Sheets-Sheet 2

INVENTOR.
ROBERT W. MITCHELL
BY PENDLETON, NEUMAN
SEIBOLD & WILLIAMS

ATTORNEYS

APPARATUS FOR COMPUTING COLOR BALANCE CHARACTERISTICS AND PREPARING IMPROVED COLOR PRINTS

RELATED APPLICATIONS

This application is a continuation-in-part of copending application Ser. No. 478,665 filed Aug. 10, 1965 in the name of Robert W. Mitchell, now U.S. Pat. No. 3,443,868.

FIELD OF THE INVENTION

This invention relates to colorimetry and more particularly to an improved method for computing the color balance in color photography and the like, to improved methods for photographically printing balanced color pictures, and to apparatus to facilitate the determination of color balance in color printing.

There are a vast number of variables which must be taken into account when preparing color prints from negatives. Color printing paper varies from batch to batch, varies with age, and its color rendition is not uniform. Furthermore, there is a wide variation in the actual color of so-called white light and while the human eye is capable of compensating for these variations in the color temperature of light, color film and printing paper do not automatically perform this compensation and, thus, startling effects are sometime produced. Further variations from the rendition of a perfect color print result from under or over exposure of the negative, the development process, the color characteristics of the camera lens and the many variables which may be introduced by the printer or enlarger.

DESCRIPTION OF THE PRIOR ART

As a result of the foregoing variables it is generally considered standard procedure in color printing to prepare a series of prints, continuously compensating for these variables until a well balanced print is ultimately produced. This procedure is costly, time consuming, and not predictable. While efforts are sometimes made to visually judge a negative and select the compensating filters, this is difficult because of the very nature of color reversal and is further complicated by the practice of film manufacturers to include an overall color, usually of an orange cast, which has been found necessary to compensate for the color characteristics of the dyes used in the film and paper. This overall color is generally defined as a "mask" and that term will be used throughout this specification in its usual sense.

It is one principal object of this invention to provide an improved method for printing color pictures with a minimum amount of preliminary testing and wasted prints.

It is another object of this invention to provide an improved method for computing the appropriate printing filter media under preset conditions for obtaining optimum color balance.

It is a further object of this invention to provide improved apparatus for measuring color characteristics and computing appropriate filter compensation.

Further and additional objects of this invention will become manifest from a consideration of this description, the accompanying drawings and the appended claims.

SUMMARY OF THE INVENTION

In one particular embodiment of this invention an improved method of producing a color print is provided wherein the printing filter media used in making the print is determined by first selecting a filter, hereinafter called a "scan filter," which is the complement of the mask, and also compensates for light variations in the enlarger, in the printing paper, the negative and the like. A new negative may now be printed without the necessity of test printing. An incremental portion of a known color in the negative to be printed is viewed through the scan filter whereby the negative is "unmasked" and compensated for paper and processing variables. The unmasked incremental area is then compared with a substantially neutral light and filter media is introduced to neutralize the incremental portion. If the operator prefers to operate on a portion of a negative other than a neutral area (i.e., a known vivid red or a flesh color) then the scan filter must include the complement of the test color so that the altered test color can be matched to the neutral or white light of the colorimeter.

By placing "printing filter media" in the viewing line of the unmasked and scan corrected incremental area and appropriately selecting the printing filter media to match known light sources, the proper printing filter is accurately determined. Thereafter a faithful print can be prepared on the sensitive material or paper by placing the printing filter in the path of the printing light.

In one preferred practice of the invention the printing filter is placed on the filter tray of the enlarger during the calibrating process and then merely left in place for printing.

Unique apparatus is provided by this invention for performing the foregoing method, the apparatus including a substantially neutral light source, means for correcting the light source to the optimum neutral temperature, means for adjusting the intensity of light from the source, a display means, means for displaying the light source and an incremental area of a negative on the display means, and a scan filter holder and printing filter holder, and associated filters for adjusting the light from the incremental area to compute the appropriate printing filter values.

BRIEF DESCRIPTION OF THE DRAWINGS

For a more complete understanding of the invention reference will now be made to the accompanying drawings wherein.

GENERAL OPERATION

Figures 1, 2, 3:
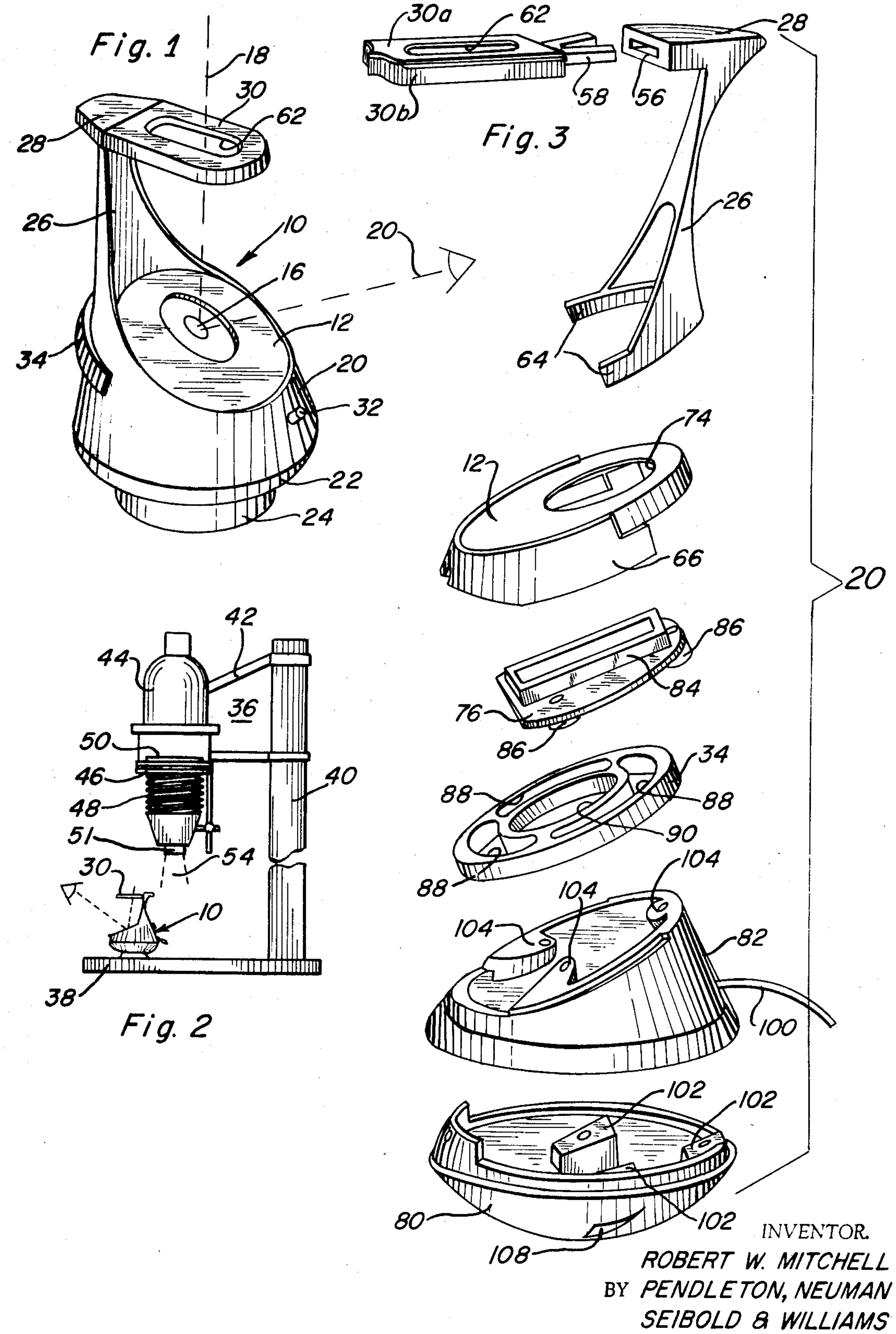
FIG. 1 is a perspective view of one embodiment of the apparatus of the invention.
FIG. 2 is a diagrammatic illustration of the embodiment of FIG. 1 in association with a photographic enlarger.
FIG. 3 is an exploded view of certain portions of the embodiment of FIG. 1.

Referring now to the drawings and more particularly to FIG. 1, a computer apparatus 10 is illustrated which includes a display deck 12 having an illuminated reference display 14 and a small central mirror 16 which reflects the unknown light from a source along the axis 18. Both the reference display 14 and reflected unknown light are viewed along the viewing axis 20. The relationship between the display deck 12, the axis of incidence 18 and the viewing axis 20 are, of course, fixed. However, to facilitate viewing the display, the lower portion 22 of the housing 20 has a spherical contour and rests in a concave recess in a base 24. The housing 20 has a neck 26 which extends upwardly and terminates in a receptacle 28. The receptacle 28 in turn receives a scan filter pack 30.

In addition to the adjustment of the orientation of housing 20 on base 24, the housing has a momentary contact push button switch 32 and an intensity control knob 34. When the push button 32 is depressed normally open contacts within the housing are closed and energize the light source. The knob 34 is rotated to match the intensity of the standard light source view on display area 14 with the intensity of the reflected image appearing on mirror 16.

The colorimeter 10 is shown in use in FIG. 2 in association with a photographic enlarger 36. The enlarger 36 includes an easel 38, a vertical column 40, and a supporting structure 42. The supporting structure 42 is generally adjustable vertically so that the enlarging head 16 supported thereon may be moved with respect to the easel 38 to determine the size of the print.

The enlarger head 52 may be of any one of many commercially available devices and in its simpler form includes a light source in housing 44, a filter tray 50, a negative tray 46, a bellows 48 and a lens 51. For simplicity in illustration, the column 40 has been foreshortened and the distance between the head 52 and easel 38 is normally much greater than that shown. Also, the colorimeter 10 is shown somewhat enlarged in relation to the enlarger for clarity.

The colorimeter 10 is adjustable on easel 30 so that the axis 18 aligns with the selected beam axis 54 of the enlarging head 52. The viewing axis 20 is then appropriately located for either a seated or standing operator regardless of the position of the colorimeter 10 on the easel 38.

Figure 4:
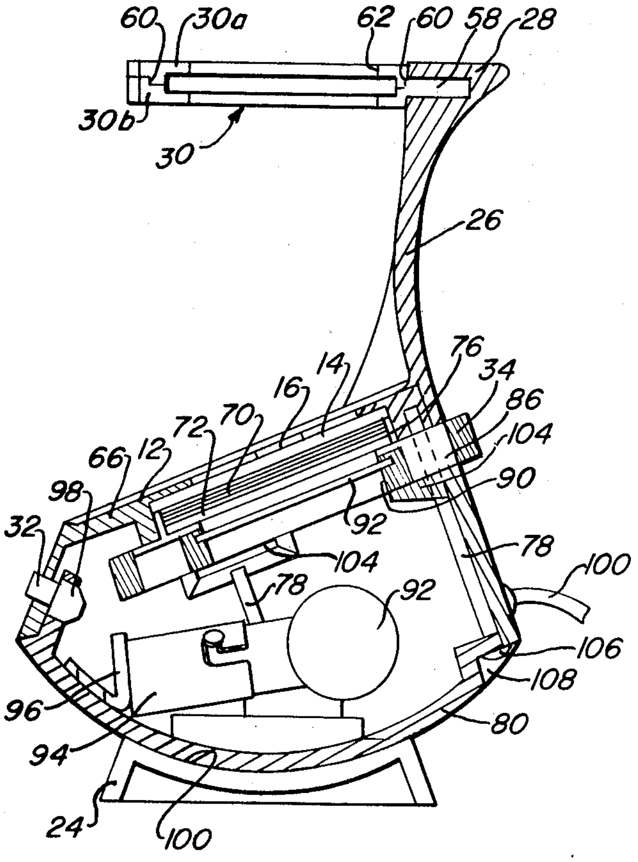
FIG. 4 is a sectional view of the embodiment of FIG. 1.

THE EMBODIMENT OF FIGS. 3 and 4.

The details of one embodiment of the invention are shown in FIGS. 3 and 4. The housing 20 is made up of a plurality of parts which may be secured together by any convenient means. In the structure illustrated the neck 26 and receptacle 28 are integrally molded of a durable plastic material such as polypropylene. The receptacle 28 has a recess 56 which yieldably receives and holds a clip 58 formed on the scan filter holder 30. In the preferred form, the scan filter holder 30 is formed of two portions 30*a* and 30*b* which are congruent and have their inner edges 60 formed to resiliently interlock.

The scan filter holder 30 has a central elongate aperture 62 to pass light from the enlarger to the display deck 12 and a peripheral recess 63 (as seen best in FIG. 4) which receives and holds a plurality of filter media. It may be desirable to have several scan filter packs preassembled in holders 30 for interchangeable use. This would be true for example, where the operator is working from several different packages of paper or film in the same time period. Several unique scan filter packs may be prepared and assembled in holders 30 for each emulsion and appropriately labeled. The scan packs may be synthesized to produce neutral flesh color, shadow, and any other color on which standardization is desired. Thereafter color correction can be quickly and accurately accomplished by plugging in the appropriate holder 30.

The neck 26 has a bifurcated portion 64 which may be cemented or otherwise secured to the housing section 66 which includes the display deck 12 and a cavity 68 which receives the various optical elements contained therein. A frosted glass 14 comprises the reference display and has the mirror 16 deposited on the front face thereof and these are secured in the housing portion 66 in alignment with the opening 74. A filter support 76 is supported within the housing portion 66 and is maintained in position by three elongate bolts 78, two of which can be seen in FIG. 4. The bolts extend upwardly through the bottom housing section 80, the intermediate housing section 82, and the compensating filter support 76, and are threaded into the upper housing portion 66. A receptacle 84 formed on compensating filter support 76 receives the color compensating filters 70 and a polarized sheet 72.

Three bosses 86 are formed on support 76 and surround the three screws 78. Bosses 86 provide bearings for the intensity control knob 34 which has three arcuate slots 88 to slidably engage the bosses 86. The standard light passes upwardly through a large central aperture 90 in the knob 34 and a polarized sheet 92 is secured in the central aperture 90. As will be readily apparent, rotation of knob 34 alters the orientation of the polarization axis of polarized sheet 92 relative to the axis of polarization of sheet 72 whereby the apparent density of the combination varies over a wide range. This enables an operator to vary the intensity of the light appearing on the frosted reference surface 14 to match the intensity of the image reflected in mirror 14. The filter pack 70 is selected to "tune" the reference light to a desired standard. The particular color temperature selected may depend in part upon individual taste but in general an incandescent lamp source corrected with a filter pack including approximately 50 cyan and 50 blue will provide a good standard white light.

As shown best in FIG. 4, the light source is a low voltage incandescent lamp 92 mounted in a conventional bayonet socket 94. The socket 94 is secured to the lower housing portion 80 by an angle bracket 96. The actual wiring is omitted for clarity but it will be clear that the lamp 92 and the push button switch 98 are connected in series to the two wire cable 100 which may be connected to any appropriate source of power. As is clear from FIG. 3, the bolts 78 pass through apertures in bosses 102 in lower housing portion 80 and in lugs 104 extending inwardly from intermediate housing portion 82. The bolt heads 106 are engageable in recesses 108 in the outer surface of lower housing portion 80.

The base 24 with the spherically concave recess 110 is clearly shown in the cross sectional view of FIG. 4. It will be apparent that the light axis 18 may be varied over a wide range through this universal mounting. Furthermore, because of the elongate shape of the slot 62 in the filter holder 30, the viewing angle may be varied over a limited range for any given position of the colorimeter 10 on its base 24.

COLOR WEDGE

Figure 5:
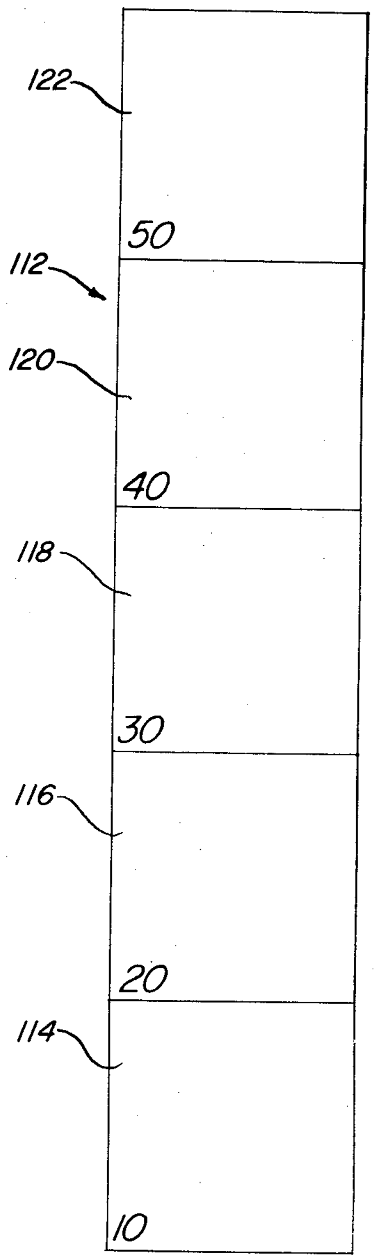
FIG. 5 is a plan view of a stepped filter media for use as a printing filter media.

The colorimeter 10 can be most effectively used with color filter media of various densities placed between the enlarger head 52 and the display deck 12. This is facilitated with the filter wedge 112 shown in FIG. 5. The wedge 112 comprises filter densities in five discrete areas varying from a minimum filter value of 10 to a maximum of 50. Three such sticks of filter material are useful in practicing this invention. While various color combinations could be used, it is preferred that sticks or step wedges of cyan, yellow and magenta be employed. As these are subtractive filters they represent the three primary colors of red, blue and green, respectively, which can be readily produced by combining the others. Thus by combining the cyan and yellow filters, green will be produced, yellow and magenta will produce red, and cyan and magenta will produce blue. If all of the constituent filters are of a given density, such as 20, then the composite densities will be the same, i.e. 20.

One easy technique for assembling the wedge stick 112 is to begin with a rectangle of filter material five squares long and three squares wide. This is cut into three equal strips, one of which forms the base 114. One square is cut from the second strip and the remaining four strips comprise the second step 116. The remaining strip is cut into two pieces, one of which is three squares in length and becomes the third step 118; the remaining two squares comprising the fourth step 120. The one square originally severed from the four becomes the fifth step 122, and all of the steps are secured together in any convenient manner, a simple staple sufficing.

THE METHOD OF COLOR PRINTING

In practicing this invention, certain preliminary steps must be performed on the apparatus. First, a compensating filter pack must be generated to convert the output of incandescent lamp 92 to a neutral white. It is preferred that the source connected to cable 100 is regulated and that the light is operated at no more than rated voltage to prevent rapid deterioration of the lamp and color changes in its output. Thus the color temperature is low, that is, the light is very rich in red. This is corrected by introducing a compensating filter, usually a cobalt color, approximately 100 cyan and 50 magenta, under the display deck 12. The filter pack is assembled in the support 76 within colorimeter 10 and no further correction of the source 92 should be required for some time. Slight corrections may be made by the individual operator to suit his color perception.

The next step is to build a scan pack for filter holder 30. This scan pack will "unmask" the negative, compensate for enlarger characteristics, and correct for emulsion characteristics. The best method for arriving at an optimum scan pack is to empirically arrive at a filter pack in enlarger tray 50 which will faithfully reproduce a negative known to the operator to have certain color characteristics including neutral areas. With the enlarger so adjusted a neutral area of the known negative is viewed on mirror 16 and filter material such as the wedges 112 are placed over the filter holder 30 until the light from the neutral area of the known negative matches the surrounding reference light 14. If there is a disparity in the intensity of the reference display 14 and the test display on mirror 16, the knob 34 is rotated to adjust the neutral density provided by the polarized sheets 72 and 92. In general, all scan pack compensation is accomplished with cyan and magenta media with about 135 cyan usually being required to remove the mask alone.

In general, scan pack synthesize is best accomplished by adding cyan media first, thus effectively shifting the light color along the cyan-red axis. When it appears that most of the red has been eliminated, magenta media are added to shift along the second, magenta-green axis, and if the first cyan adjustment was accurately done, total compensation can be accomplished in this two-step process. Often, as the magenta is added, the operator is aware that the near-white light was not perfectly centered along the cyan-red axis and further adjustment, or fine tuning, is appropriate.

With the scan filter pack established, it is placed in the holder 30 and appropriately labeled. Thereafter, this pack provides an automatic compensator for computing further correction for any negative which is to be printed.

In making a print on paper having known characteristics from a negative of unknown characteristics, the appropriate scan pack holder 30 is placed in the receptacle 28 and the negative placed in tray 46 of enlarger 36. The colorimeter 10 is placed on the easel 38 and a portion of the negative is viewed on the display deck 12. A neutral area in the image is selected and this is centered on the aperture 62 of the holder 30. If there are no known neutral areas in the negative, a deep shadow area will usually provide very satisfactory results, as it has been discovered that there is sufficient scattered light even in the deepest shadow area to provide an indication of the nature of the light source of the original exposure. Thus in practicing this invention, it is possible to compensate for unusual lighting conditions even while viewing what appears to be a colorless deep shadow. A special shadow scan pack should be made for this use.

With the negative in place and the colorimeter 10 adjusted properly for viewing angle and light intensity, the step wedges 112 of filter material are placed between the enlarging head 52 and the mirror 16 and varied until a white-to-white match is obtained. By placing the filter media thus determined into the tray 50 of enlarger 36, an optimum color print can be made immediately without further testing or wasted time or material.

The media placed in the enlarger tray 50 will generally be yellow and magenta.

With the color balanced by using the computer colorimeter herein described, all that remains is to determine exposure time. This may be done with any available means such as the PM-14 Photoval of the Heath Company. Such a device measures the light intensity of selected negative areas and insures an optimum exposure.

If the print generated by the above method does not have the optimum color balance, or if it is desired to alter the tonal quality of the picture artificially by adding a color cast thereto, this can best be accomplished by practicing the method and using the apparatus described in U.S. patent application Ser. No. 528,982 filed Feb. 21, 1966 in the name of Robert W. Mitchell.

Without further elaboration, the foregoing will so fully explain the character of the invention that others may, by applying current knowledge, readily adapt the same for use under varying conditions of service, while retaining certain features which may properly be said to constitute the essential items of novelty involved, which items are intended to be defined and secured by the following claims.

I claim:

1. Apparatus for computing color balance in color photography by adjusting the color of light from a first source projected through an area of a diaphanous member unto a projection surface, said apparatus comprising a base member adapted to rest on said surface, housing means supported on said base member, neutral light source means supported in said housing means, display means supported on said housing means including a diaphanous portion through which light from said neutral light source means is visible and an adjacent portion where the light from said first source is reflectively displayed, filter support means mounted on said housing in the pathway of one of said light sources, and adjusting means including a universally movable connection between said base member and said housing means to provide universally adjustable reflective means in the pathway of light from said first source to facilitate viewing said display.

2. The apparatus of claim 1 wherein the bottom portion of said housing means is convex and an upper surface of said base member is concave to comprise said universally movable connection.

3. The apparatus of claim 1 including means within said housing for varying the intensity of the light on said display means from said neutral light source.

4. Apparatus for computing color balance in color photography by adjusting the color of light from a first source projected through an area of a diaphanous member unto a projection surface, said apparatus comprising a base member adapted to rest on said surface, housing means supported on said base member and including a neck portion extending upwardly therefrom, neutral light source means supported in said housing means, display means supported on said housing means including a diaphanous portion through which light from said neutral light source means is visible and an adjacent portion where the light from said first source is reflectively displayed, filter support means mounted with respect to said neck portion in the pathway of one of said light sources, filter means supported by said filter support means in the pathway of light from said first source and between said first source and said reflective means, and adjusting means to alter the pathway of light from said first light source including universally adjustable reflective means in the pathway of light from said first source to receive light from said first light source and to facilitate viewing said display, said display means being substantially planar and disposed at an acute angle to a line extending between the center of said display means and the center of said filter means.

5. Apparatus for computing color balance in color photography by adjusting the color of light from a first source projected through an area of a diaphanous member unto a projection surface, said apparatus comprising a base member adapted to rest on said surface, housing means supported on said base member, neutral light source means supported in said housing means, display means supported on said housing means including a diaphanous portion through which light from said neutral light source means is visible and an adjacent portion where the light from said first source is reflectively displayed, filter support means mounted on said housing in the pathway of one of said light sources, means within said housing for varying the intensity of the light on said display means from said neutral light source, and adjusting means to alter the pathway of light from said first light source including universally adjustable reflective means in the pathway of light from said first source to receive light from said first light source and to facilitate viewing said display.

6. The apparatus of claim 5 wherein said means varying the intensity of the light comprises polarized overlying sheets between said neutral light source and said display means, and manually engageable means exposed on said housing to effect relative rotation of said sheets.

7. Apparatus for computing color balance in color photography by adjusting the color of light from a first source projected through an area of a diaphanous member unto a projection surface, said apparatus comprising a base member adapted to rest on said surface, housing means supported on said base member and including a neck portion extending upwardly therefrom, neutral light source means supported in said housing means, display means supported on said housing means including a diaphanous portion through which light from said neutral light source means is visible and an adjacent portion where the light from said first source is reflectively displayed, filter support means mounted with respect to said neck portion in the pathway of one of said light sources, said filter support means comprising a frame for said filter means, interconnecting means on said neck and said filter support means for detachably securing said filter support means to said neck, and adjusting means to alter the pathway of light from said first light source including universally adjustable reflective means in the pathway of light from said first source to receive light from said first light source and to facilitate viewing said display.

* * * * *